(12) United States Patent
Noonan et al.

(10) Patent No.: US 9,334,178 B2
(45) Date of Patent: May 10, 2016

(54) VORTEX-TYPE GRIT CHAMBER

(71) Applicant: Smith & Loveless Inc., Lenexa, KS (US)

(72) Inventors: Francis M. Noonan, Osawatomie, KS (US); Frederick Trentadue, Olathe, KS (US); John K. Kelly, Overland Park, KS (US); Dale White, Gardner, KS (US); Rodney S. Mrkvicka, Leawood, KS (US)

(73) Assignee: Smith & Loveless Inc., Lenexa, KS (US)

( * ) Notice: Subject to any disclaimer, the term of this patent is extended or adjusted under 35 U.S.C. 154(b) by 480 days.

(21) Appl. No.: 13/837,712

(22) Filed: Mar. 15, 2013

(65) Prior Publication Data

US 2014/0124436 A1   May 8, 2014

Related U.S. Application Data

(60) Provisional application No. 61/723,935, filed on Nov. 8, 2012.

(51) Int. Cl.
| | |
|---|---|
| *E03F 5/14* | (2006.01) |
| *C02F 1/38* | (2006.01) |
| *B01D 21/24* | (2006.01) |
| *B01D 21/26* | (2006.01) |

(Continued)

(52) U.S. Cl.
CPC .............. *C02F 1/38* (2013.01); *B01D 21/0024* (2013.01); *B01D 21/2411* (2013.01); *B01D 21/2444* (2013.01); *B01D 21/267* (2013.01); *B01D 21/302* (2013.01); *E03F 5/14* (2013.01); *C02F 1/385* (2013.01)

(58) Field of Classification Search
CPC ............ B01D 21/0024; B01D 21/0039; B01D 21/0042; B01D 21/0069; B01D 21/0072; B01D 21/0087; B01D 21/02; B01D 21/24; B01D 21/2405; B01D 21/2411; B01D 21/2444; B01D 21/2494; B01D 21/245; B01D 21/26; B01D 21/267; B01D 21/30; B01D 21/302; B01D 21/34; C02F 1/006; C02F 1/38; C02F 1/385; C02F 2303/24; E03F 5/14; B04C 3/06
USPC ........ 210/257.1, 512.1, 512.3, 519, 521, 523, 210/532.1
See application file for complete search history.

(56) References Cited

U.S. PATENT DOCUMENTS

| | | | | | |
|---|---|---|---|---|---|
| 2,894,637 | A | * | 7/1959 | Schreiber | ............... B01D 21/06 210/519 |
| 3,006,474 | A | * | 10/1961 | Fitch | ............................. 210/776 |
| 3,419,145 | A | * | 12/1968 | De Celis | ............ B01D 17/0211 210/261 |

(Continued)

*Primary Examiner* — David C Mellon
(74) *Attorney, Agent, or Firm* — Wood, Phillips, Katz, Clark & Mortimer

(57) ABSTRACT

A grit removal unit including an influent channel directing wastewater with grit into a round grit removal chamber and an effluent channel receives wastewater output from the chamber. A divider wall extends upwardly between the sides of the influent channel, and gates at the upstream end of the divider wall are adjustable to selectively open channel portions on opposite sides of the divider wall. An output guide member is mounted to allow selective adjustment of output flow opening width "c" to the effluent channel. The output guide member has a horizontal bottom extending from the chamber into the effluent channel across the width of the output opening, and a guide wall extending upwardly from the guide member bottom. The guide wall has a forward end spaced from the chamber annular vertical wall to define the output flow opening width therebetween.

14 Claims, 3 Drawing Sheets

(51) Int. Cl.
*B01D 21/00* (2006.01)
*B01D 21/30* (2006.01)

(56) References Cited

U.S. PATENT DOCUMENTS

| | | | | |
|---|---|---|---|---|
| 3,926,805 A * | 12/1975 | Walker | | 210/101 |
| 5,643,463 A * | 7/1997 | Wood | | B01D 21/0003 210/194 |
| 6,365,045 B1 * | 4/2002 | Bache | | 210/256 |
| 8,540,887 B2 * | 9/2013 | Triglavcanin | | B01D 21/2411 210/519 |
| 8,715,511 B2 * | 5/2014 | Beliveau | | B01D 21/003 210/257.1 |
| 8,889,012 B2 * | 11/2014 | Turner | | B01D 21/2411 210/208 |
| 2003/0085164 A1 * | 5/2003 | Davis et al. | | 209/725 |
| 2007/0095032 A1 * | 5/2007 | Nilsen et al. | | 55/418 |
| 2011/0079563 A1 * | 4/2011 | Triglavcanin et al. | | 210/800 |

* cited by examiner

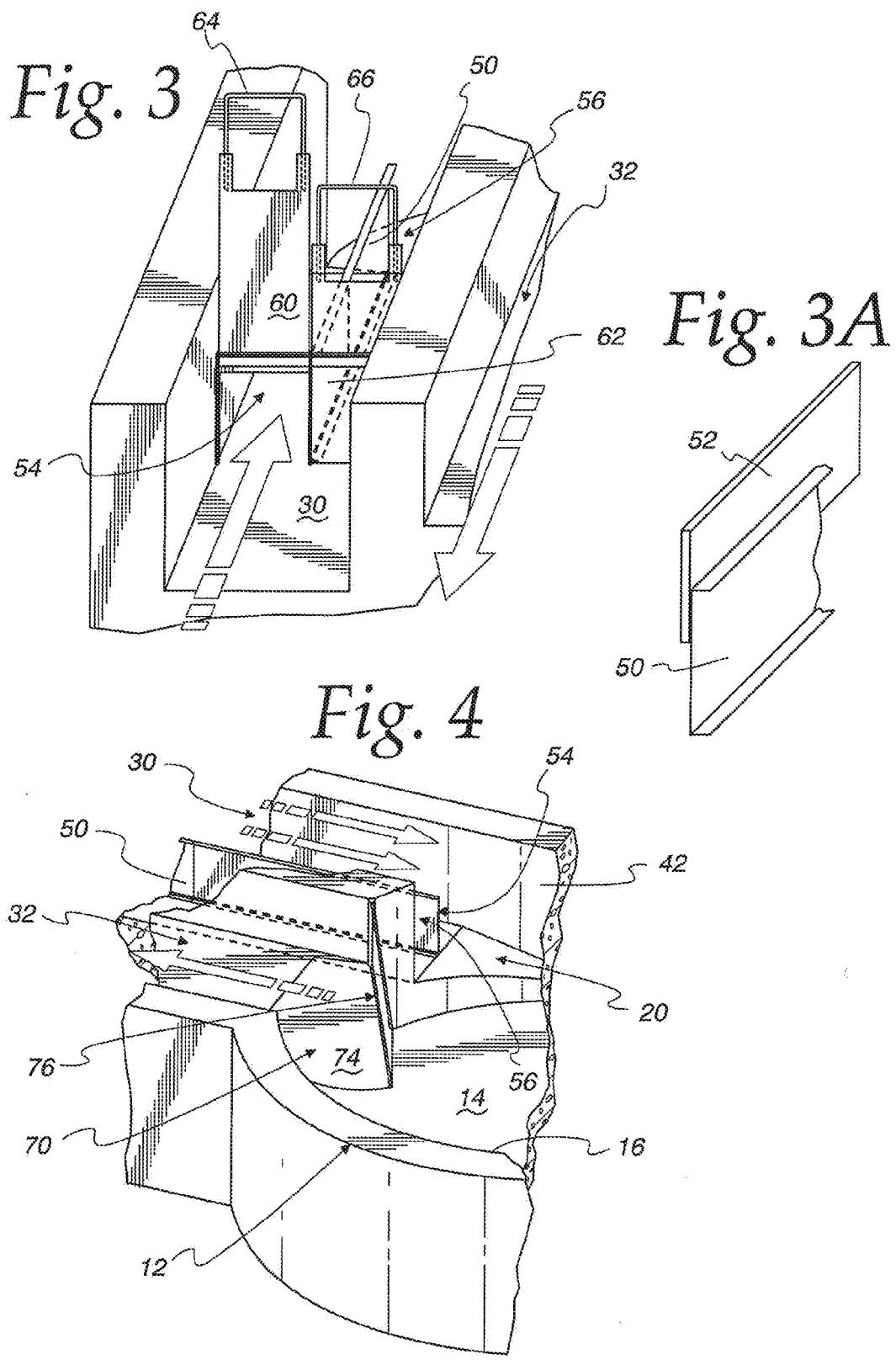

VORTEX-TYPE GRIT CHAMBER

CROSS-REFERENCE TO RELATED APPLICATIONS

This is a non-provisional application based on U.S. Ser. No. 61/723,935, filed Nov. 8, 2012.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to water or waste water treatment systems that incorporate a grit removal system, and more particularly to a grit trap for a waste water system.

BACKGROUND OF THE INVENTION

In many industrial and municipal waste systems, wastewater which is laden with grit is pumped from a primary recovery device in the waste stream to a secondary device (e.g., a cyclone separator) which further concentrates the grit. The stream may also pass through a third device (e.g., a screw conveyor) to further dry and concentrate the grit.

Grit removal systems such as grit extractors or grit traps have been used in many waste systems to remove grit from the waste water prior to passing the water on to a recovery device of the system. For example, one advantageous apparatus includes flumes for injecting and extracting liquid tangentially relative to a round chamber, creating a circular flow stream which causes the grit to settle near the bottom center of the round chamber. That grit in the injected liquid is thus removed from the liquid stream and collected in the storage chamber for relatively easy removal. Such an apparatus is disclosed in U.S. Pat. No. 6,811,697 B2.

U.S. Pat. Nos. 3,941,698, 4,107,038 and 4,767,532, 7,971,732 also disclose vortex-type grit extractor apparatuses. U.S. Pat. No. 4,767,532, for example, discloses an apparatus for removing grit in which a grit storage chamber is provided beneath the center of the round chamber of the grit removal system. A removable plate substantially aligned with the floor of the round chamber generally separates the two chambers, with a central opening through the plate permitting communication between the chambers. A cylindrical shaft is rotatably supported on its upper end above the round chamber and extends down through the round chamber through the plate central opening. Liquid flow in the round chamber forces grit particles to settle toward the chamber floor, where they are urged radially inwardly so as to drop through the plate central opening into the grit storage chamber. A multi-bladed propeller is mounted on that shaft above the plate, and rotates with the shaft to assist in the liquid flow to move the grit toward the plate center opening. A pipe also extends down through the cylindrical shaft into the grit storage chamber, and a pump is provided on the upper end of the pipe to allow grit in the bottom of the storage chamber to be removed by pumping up through the pipe.

The disclosures of all of these patents are also hereby fully incorporated by reference.

Operation of such grit removal units depend on removal of grit from the waste water as the water flows from the influent channel around the round chamber to an effluent channel.

Further, since the flow of wastewater with such grit is not constant or uniform, a wide range of low to high flow rates need to be accommodated over the life of the unit. Given such a potential range of flow rates, in which the influent channel needs to be able to handle high flow rates, problems can be encountered with low flow rates. For example, when flow rates are encountered which are much lower than the design rate of the grit removal apparatus, the velocity of the influent channel is significantly reduced at such low flow rates and undesirable premature settling of grit in the influent channel can occur. Where such low flow rates are encountered over a long period of time, this can result in grit undesirably settling and remaining in the influent channel for long periods of time, until a significant flow event occurs which is capable of lifting and flushing the grit to the chamber for removal.

The present invention is directed toward overcoming one or more of the problems set forth above.

SUMMARY OF THE INVENTION

In accordance with one aspect of the present invention, a grit removal unit for a wastewater system is provided, including a round grit removal chamber defined by a bottom surface and a substantially annular vertical wall extending up from the bottom surface, with input and output openings through the annular vertical wall. The input opening has a bottom surface above the bottom surface of the grit removal chamber, with a sloped bottom surface extending between the input opening bottom surface and the chamber bottom surface. The output opening has a bottom above the bottom surface of the grit removal chamber. An influent channel directs wastewater with grit into the chamber through the annular vertical wall input opening, and has two side walls including one which is substantially tangential to the annular vertical wall. A divider wall extends upwardly in the influent channel between the influent channel side walls and defines a first influent channel portion between the divider wall and the one influent channel side wall and a second influent channel portion between the divider wall and the other influent channel side wall. First and second gates are at the upstream end of the first and second influent channel portions, respectively, with the first gate being adjustable to selectively open flow of wastewater with grit to the first influent channel portion and the second gate being adjustable to selectively open flow of wastewater with grit to the second influent channel portion. An effluent channel receives wastewater output from the chamber through the output opening, and an output guide member is adjustably mounted to the chamber and effluent channel whereby the output flow opening width may be selectively adjusted. The output guide member has a substantially horizontal bottom extending from the chamber into the effluent channel across the width of the output opening, and a guide wall extending upwardly from the guide member bottom. The guide wall has a forward end spaced from the chamber annular vertical wall at the output opening to define the output flow opening width therebetween, and a rear end extending through the output opening and into the effluent channel.

In one form of this aspect of the invention, adjustment of the first and second gates and the output guide member are coordinated based on anticipated flow through the grit removal unit.

In another form of this aspect of the invention, the second gate is closed to block flow through the second influent channel portion when low flow of wastewater with grit is anticipated.

In still another form of this aspect of the present invention, the output opening is positioned at about 270 degrees around the round grit removal chamber from the input opening. In a further form, the influent channel and the effluent channel are substantially parallel with the wastewater flowing in opposite directions.

In yet another form of this aspect of the present invention, the divider wall is spaced a distance "a" from the one influent channel side wall and spaced a distance "b" from the other influent channel side wall, where "a" and "b" are not equal. In a further form, the distance "a" provides a flow velocity sufficiently high during anticipated periods of low flow of the influent wastewater with grit to prevent significant settlement of grit from the wastewater in the influent channel.

In another form of this aspect of the invention, the output guide member is mounted whereby its opening angle "d" and the output flow opening "c" may be selectively adjusted.

In still another form of this aspect of the invention, the guide wall of the output guide member is selectively positioned relative to the chamber vertical wall to provide an effective effluent opening of substantially the same width as width of the open influent channel portions.

In yet another form of this aspect of the invention, the divider wall is a baffle having an adjustable height.

In accordance with another aspect of the present invention, a grit removal unit for a wastewater system is provided, including a round grit removal chamber defined by a bottom surface and a substantially annular vertical wall extending up from the bottom surface, with input and output openings through the annular vertical wall. The input opening has a bottom surface above the bottom surface of the grit removal chamber, with a sloped bottom surface extending between the input opening bottom surface and the chamber bottom surface. The output opening has a bottom above the bottom surface of the grit removal chamber. An influent channel directs wastewater with grit into the chamber through the annular vertical wall input opening, and has two side walls including one which is substantially tangential to the annular vertical wall. A divider wall extends upwardly in the influent channel between the influent channel side walls and defines a first influent channel portion between the divider wall and the one influent channel side wall and a second influent channel portion between the divider wall and the other influent channel side wall. First and second gates are at the upstream end of the first and second influent channel portions, respectively, with the first gate being adjustable to selectively open flow of wastewater with grit to the first influent channel portion and the second gate being adjustable to selectively open flow of wastewater with grit to the second influent channel portion. An effluent channel receives wastewater output from the chamber through the output opening.

In one form of this aspect of the invention, the second gate is closed to block flow through the second influent channel portion when low flow of wastewater with grit is anticipated.

In another form of this aspect of the present invention, the output opening is positioned at about 270 degrees around the round grit removal chamber from the input opening. In a further form, the influent channel and the effluent channel are substantially parallel with the wastewater flowing in opposite directions.

In yet another form of this aspect of the present invention, the divider wall is spaced a distance "a" from the one influent channel side wall and spaced a distance "b" from the other influent channel side wall, where "a" and "b" are not equal. In a further form, the distance "a" provides a flow velocity sufficiently high during anticipated periods of low flow of the influent wastewater with grit to prevent significant settlement of grit from the wastewater in the influent channel.

In still another form of this aspect of the invention, the divider wall is a baffle having an adjustable height.

In accordance with still another aspect of the present invention, a grit removal unit for a wastewater system is provided, including a round grit removal chamber defined by a bottom surface and a substantially annular vertical wall extending up from the bottom surface, with input and output openings through the annular vertical wall. The input opening has a bottom surface above the bottom surface of the grit removal chamber, with a sloped bottom surface extending between the input opening bottom surface and the chamber bottom surface. The output opening has a bottom above the bottom surface of the grit removal chamber. An influent channel directs wastewater with grit into the chamber through the annular vertical wall input opening and has two side walls. An effluent channel receives wastewater output from the chamber through the output opening, and an output guide member is adjustably mounted to the chamber and effluent channel whereby the output flow opening width may be selectively adjusted. The output guide member has a substantially horizontal bottom extending from the chamber into the effluent channel across the width of the output opening, and a guide wall extending upwardly from the guide member bottom. The guide wall has a forward end spaced from the chamber annular vertical wall at the output opening to define the output flow opening width therebetween, and a rear end extending through the output opening and into the effluent channel.

In one form of this aspect of the invention, the output guide member is mounted whereby its opening angle "d" and the output flow opening "c" may be selectively adjusted.

In another form of this aspect of the invention, a divider wall extends upwardly in the influent channel between the influent channel side walls and defines a first influent channel portion between the divider wall and the one influent channel side wall and a second influent channel portion between the divider wall and the other influent channel side wall. First and second gates are at the upstream end of the first and second influent channel portions, respectively, with the first gate being adjustable to selectively open flow of wastewater with grit to the first influent channel portion and the second gate being adjustable to selectively open flow of wastewater with grit to the second influent channel portion. In a further form, the divider wall is a baffle having an adjustable height.

Other objects, features, and advantages of the invention will become apparent from a review of the entire specification, including the appended claims and drawings.

BRIEF DESCRIPTION OF THE DRAWINGS

FIG. 3 is a perspective view of the influent channel of the grit removal unit;

FIG. 3A is a partial perspective view of an alternate embodiment of the influent channel baffle having an adjustable portion;

FIG. 4 is a perspective view illustrating the output from the round chamber to the effluent chamber.

DETAILED DESCRIPTION OF THE PREFERRED EMBODIMENT

Figure 1:
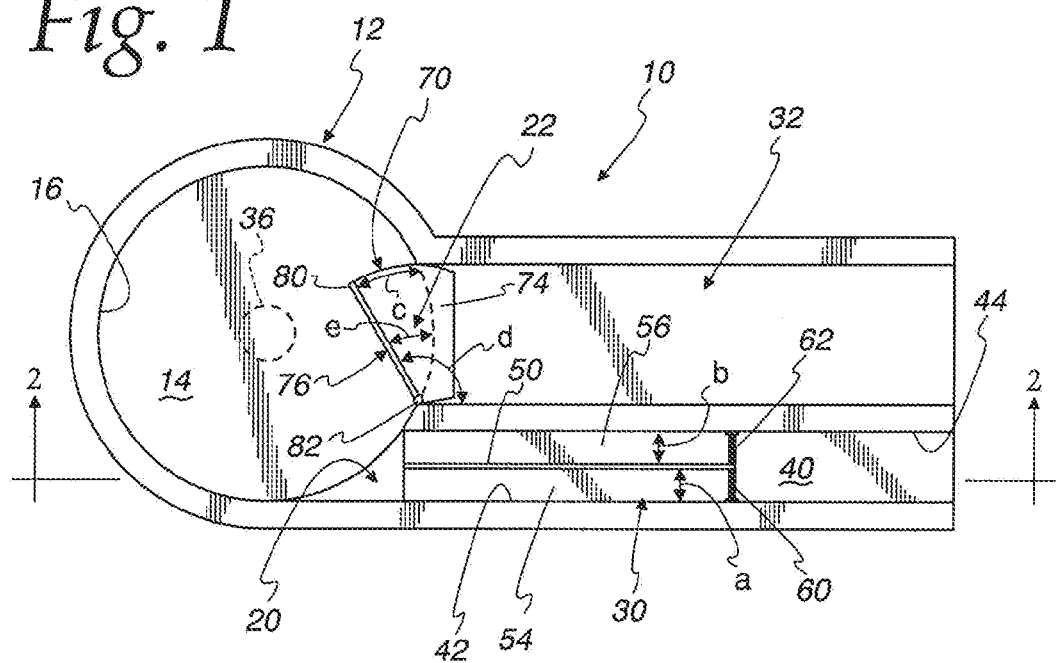
FIG. 1 is a top view of the round chamber and influent and effluent chambers of a grit removal unit according to the present invention.

The advantageous features of a grit removal unit 10 according to the present invention are illustrated in the Figures.

Specifically, as is known in the art, the grit removal unit 10 includes a round chamber 12 having a bottom surface or floor 14 with a generally annular vertical wall 16 extending upwardly from the floor 14.

Input and output openings 20, 22 through the annular vertical wall 16 are connected to influent and effluent troughs or channels 30, 32, where the output opening 22 is raised above the floor 14 of the round chamber 12. As illustrated, the output opening 22 may advantageously be positioned at about 270 degrees around the round grit removal chamber 12 from the input opening 20, although it should be understood that the present invention may also be advantageously used in systems where the output opening 22 is at other positions relative to the input opening 20. Wastewater with grit is carried into the round chamber 12 through the influent channel 30, with grit removed in the round chamber 12 and wastewater from which grit has been removed carried from the round chamber 12 via the effluent channel 32.

As illustrated in phantom in FIG. 1, and as generally known in the art (such as taught in U.S. Pat. No. 7,971,732), a grit removal chamber 36 may be provided at the bottom of the round chamber 12 where grit and other objects may be directed and then removed. Not shown but as also recognized in the art, a drive including, for example, a multi-bladed propeller, may also be provided to facilitate movement of grit removed from the wastewater toward and into the grit removal chamber 36.

In accordance with one aspect of the present invention, the influent channel 30 is defined by a bottom 40 which is at a level slightly above the bottom surface 14 of the round chamber 12, and two upright side walls 42, 44, one of which 42 is substantially tangential to the annular vertical wall 16 of the round chamber as best seen in FIG. 1. The bottom 40 of the influent channel 30 tapers down (at 48) to the level of the round chamber bottom surface 14 at the input opening 20 of the chamber 12.

Figure 2:
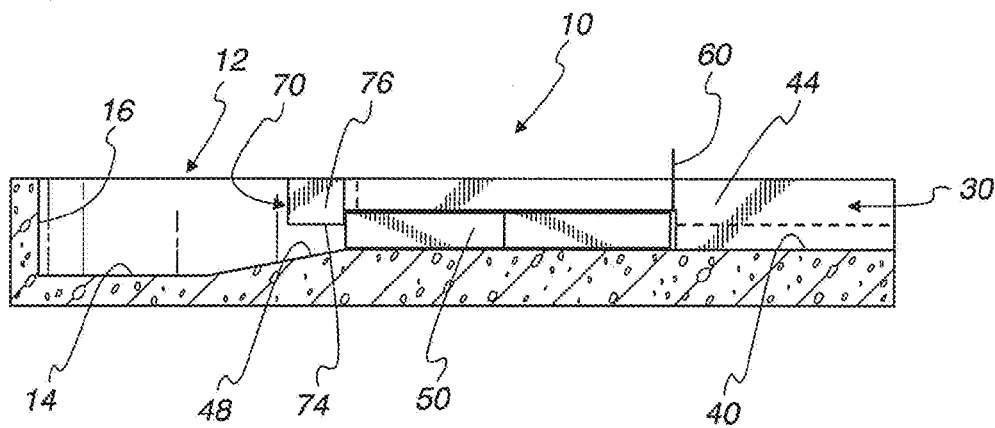
FIG. 2 is a side cross-sectional view taken along line 2-2 of FIG. 1.
Figure 5:
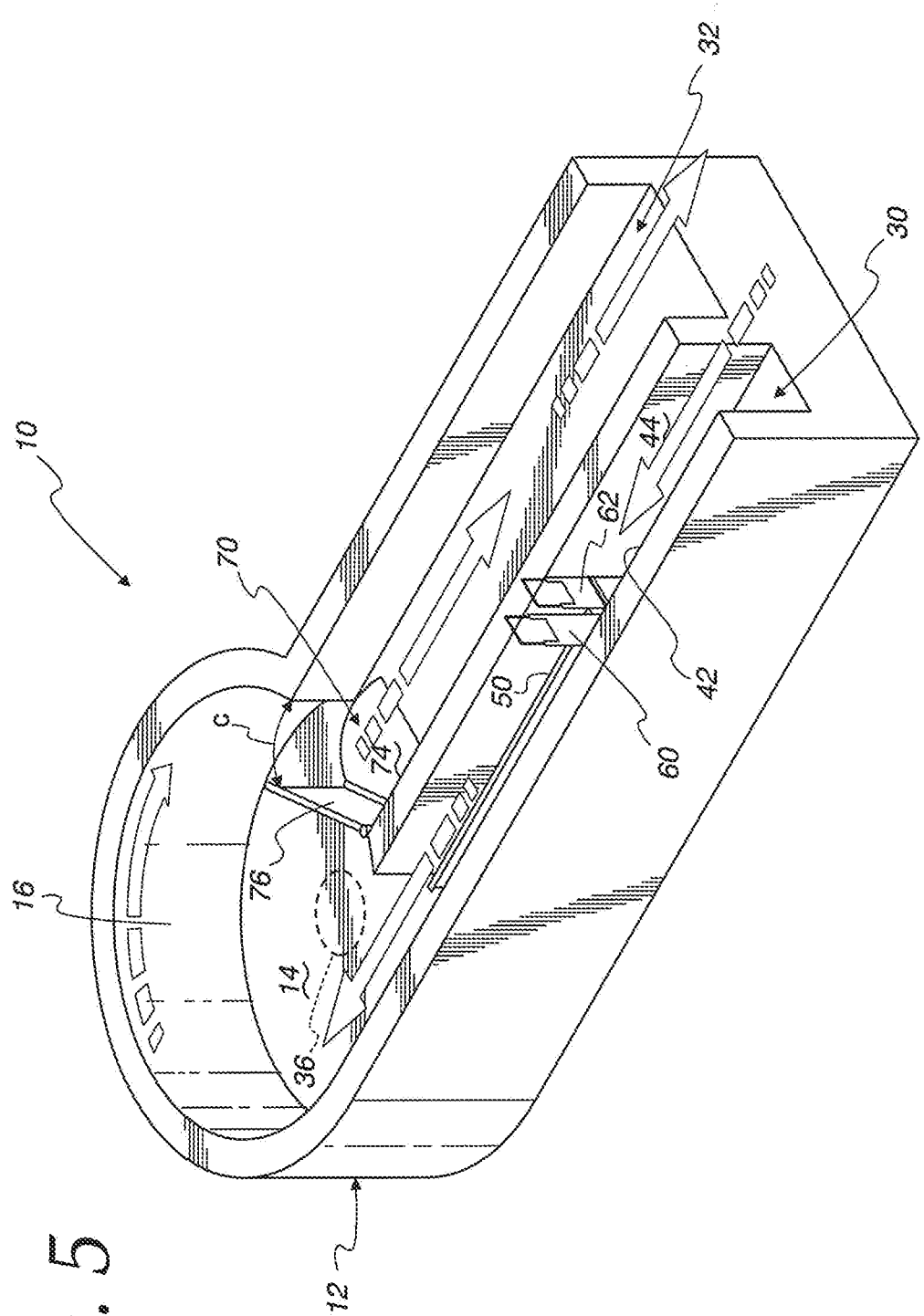
FIG. 5 is a perspective view of the round chamber and influent and effluent channels of a grit removal unit according to the present invention.

As best illustrated in FIGS. 2-3, a baffle or divider wall 50 extends upwardly from the influent channel bottom 40 and is substantially parallel to the side walls 42, 44. The baffle 50 serves to effectively divide the influent channel 30 into separate smaller passages 54, 56. The baffle 50 may have an adjustable portion 52 (see FIG. 3A) suitably secured along its top to allow the overall height of the baffle to be adjusted if and as desired. Such adjustability allows the unit 10 to compensate for variations in the influent flow volume introduced into the influent channel as well as meeting actual site conditions. Further, the adjustable portion 52 may be advantageously designed to allow influent flow volumes in excess of the flow condition to overflow the divider wall to maintain the desired velocity in each of the influent channel passages 54, 56 and not cause an excess flow velocity to occur in either channel passage 54, 56.

The baffle 50 is spaced a distance "a" from the outer influent channel side wall 42 and a distance "b" from the inner influent channel side wall 44 (see FIG. 1). While "a" and "b" may advantageously be different distances so that the separate smaller passages 54, 56 are different sizes, it should be understood that at least some advantages of the present invention could be obtained where "a" and "b" are equal. It should also be appreciated that the distance "a" may be selected so as to provide a sufficiently higher flow velocity during anticipated periods of low flow of the influent wastewater to prevent significant grit settlement in the Influent channel 30.

Gates 60, 62 are provided at the upstream end of the baffle 50, which gates 60, 62 may be selectively opened and/or closed to allow flow through either or both of the separate passages. As illustrated, the gates 60, 62 include handles 64, 66 allowing an operator to manually grasp the gates 60, 62 by the handles 64, 66 and raise or lower (or remove or install) the gates 60, 62 to open or close selected passages 54, 56 on opposite sides of the baffle 50. As illustrated, the gates 60, 62 each have a slide connection allowing vertical movement. It should be appreciated, however, that it would be within the scope of at least some aspects of the invention for the gates 60, 62 to also be supported in a different fashion to open and close each of the smaller passages 54, 56 including, for example, pivoting movement around horizontal axes and/or around vertical axes. Further, movement of the gates 60, 62 could alternatively be controlled by powered drives (e.g., mechanically) which could be controlled manually or automatically based on flow rate measurements. Still further, whereas the gates 60, 62 as illustrated in the Figures are perpendicular to the direction of wastewater flow (see particularly FIG. 3), at least some advantageous aspects of the present invention could be had with the gates 60, 62 oriented differently (e.g., the two gates 60, 62 could form a "V" shape when viewed from above, with the point of the "V" either facing the influent flow, or oriented toward the input opening 20 of the round chamber 12). Moreover, at least some aspects of the present invention could be had with gates 60, 62 which have a non-planar face, and/or a face which is not fully vertical.

For example, as illustrated in FIG. 3, one gate 60 may be opened and the other gate 62 closed during a low flow period to allow flow of wastewater with grit through only the outer passage 54, thereby causing flow velocity to be increased over what it would be through both passages 54, 56 combined and decrease or eliminate undesirable settling of grit onto the bottom of the influent channel 30 which would occur at such a lower flow velocity.

Where "a" is not equal to "b" as previously noted, it should be appreciated that each of the passages 54, 56 would be different, such that effectively three different effective influent channels 30 could be provided, that is, passage 54 only, passage 56 only, and passages 54 and 56 combined. During operation during which only one passage is opened, however, it should be appreciated that the outer passage 54 could be advantageous in that it would provide a longer grit travel path, as well as directing flow tangentially into the round chamber 12, and thereby increase the probability of grit capture in the round chamber 12 as desired.

At higher (e.g., normal design) flow rates, where flow velocity through only one passage (e.g., outer passage 54 as illustrated in FIG. 3) would be too high to allow for proper grit removal in the round chamber 12), then both gates 60, 62 could be opened whereby the two passages 54, 56 together would allow wastewater flow at the desired flow velocity (lower than would occur with just one passage 54 or 56 open).

It should be appreciated that though in the illustrated embodiment a single baffle 50 with two gates 60, 62 are shown, it would be within the scope of at least some aspects of the present invention to provide more baffles and gates. For example, two baffles and three gates could be provided in the influent channel 30, in which case seven different effective influent flow channels could be presented (each of the three different passages A, B, C alone, three different combinations of two passages AB, AC, BC, and all three passages ABC). Typically, however, it would be advantageous to open the passages sequentially beginning with the outer passage (i.e., A, then AB with higher flow rates, then ABC with still higher flow rates). Still further, one smaller passage could be provided with no gate such that flow through at least that one passage would always be permitted.

An output baffle or guide member 70 is located at the output opening 22 (i.e., the entrance to the effluent channel 32 from the round chamber 12). The output baffle 70 includes a substantially horizontal bottom 74 extending from the round chamber 12 into the effluent channel 32 across the width of the output opening 22, and a guide wall 76 extending upwardly (e.g., at a 90 degree angle) from the guide member bottom 74. The forward end 80 (see FIG. 1) of the guide wall 76 is spaced from the chamber annular vertical wall 16 at the output opening 22 to define an output flow opening width therebetween. The rear end 82 (see FIG. 1) of the guide wall 76 extends through the output opening 22 and into the effluent channel 32, whereby wastewater which passes between the forward end 80 of the guide wall 76 and the annular vertical wall 16 above the guide member bottom 74 will be directed into the effluent channel 32 away from the round chamber 12.

The output baffle 70 advantageously limits short circuiting of grit from the influent channel 30 to the effluent channel 32 or from the floor 14 of the chamber 12 near the effluent channel 32, with the guide wall 76 acting to restrict the effective effluent channel opening area in order to control velocity, and direct flow into the effluent trough, all of which aids grit removal by helping to ensure that wastewater exiting via the effluent channel 32 will have sufficient grit removed by sufficiently flowing through the round chamber 12 prior to reaching the effluent channel 32.

Further, the output baffle 70 may advantageously be adjustably mounted relative to the effluent channel 32 (allowing, e.g., horizontal translation and/or rotation about a vertical axis). Such adjustment may be accomplished by, for example, manual or automatic operations. For example, the output baffle 70 can be mounted using a hinge, and hydraulic or electric operators can be mounted to the baffle 70 to change its position. Moreover, control of such operators may advantageously be initiated by an operator by using simple switches, or can be tied into additional instrumentation, such as the plant flowmeter, with adjustment of the baffle 70 being automatic based on data input and logic control.

Adjustable mounting of the output baffle 70 allows selective adjustment of the output flow opening width or effective effluent opening "c" (see FIG. 1), as well as adjustment to both the opening angle "d" and the protrusion distance "e" into the chamber 12 parallel to the influent flow. The adjustable opening angle "d" allows for better control of effluent velocity, and the output flow opening width "c" assists in deterring short circuiting at given opening angles.

Advantageously, the output baffle 70 may be positioned so that the effective effluent opening "c" is the same width as the total influent channel 30, and the protrusion distance "e" is such that the guide wall 76 meets the side wall of the effluent channel 32 that is nearest the influent channel 30. While in normal operation the grit removal unit 10 may not require adjustment to the opening angle or protrusion distance on a regular basis, at full flow further opening the effluent channel 32 via the opening angle "d" and/or protrusion distance "e" may be advantageous. Moreover, at even lower flow, further closing the effluent channel 32 via the opening angle "d" and/or protrusion distance "e" may be beneficial to the performance.

It should be appreciated that grit removal units 10 according to the present invention may advantageously ensure proper operation of the unit to remove grit over the varying conditions which will be encountered over the years long life of the unit.

The invention claimed is:

1. A grit removal unit for a wastewater system, comprising:
a round grit removal chamber defined by a grit removal chamber bottom surface and a substantially annular grit removal chamber vertical wall extending up from said grit removal chamber bottom surface;
an input opening through said grit removal chamber vertical wall, said input opening having an input opening bottom surface above the grit removal chamber bottom surface, with a sloped bottom surface extending between said input opening bottom surface and said grit removal chamber bottom surface;
an output opening through said grit removal chamber vertical wall, said output opening having a bottom above the grit removal chamber bottom surface;
an influent channel for directing wastewater with grit from an upstream end to a downstream end into said grit removal chamber through said grit removal chamber vertical wall input opening, said influent channel having two influent channel side walls with one of said influent channel side walls substantially tangential to said grit removal chamber vertical wall;
a divider wall extending upwardly in said influent channel between said influent channel side walls and defining a first influent channel portion between said divider wall and said one influent channel side wall and a second influent channel portion between said divider wall and the other influent channel side wall;
first and second gates at the upstream end of said first and second influent channel portions, respectively, said first gate being adjustable to selectively open flow of wastewater with grit to said first influent channel portion and said second gate being adjustable to selectively open flow of wastewater with grit to said second influent channel portion;
an effluent channel for wastewater output from said grit removal chamber through said output opening; and
a unitary output guide member having a guide wall extending upward from a substantially horizontal output guide member bottom along an edge of said output guide member bottom wherein
said guide wall has
a forward end spaced from said grit removal chamber vertical wall at said output opening to define an output flow opening width between said grit removal chamber vertical wall and said guide member guide wall forward end, and
a rear end extending through said output opening and into said effluent channel, and
said output guide member bottom extends from said guide wall within said grit removal chamber into said effluent channel across substantially the entire width of the output opening whereby effluent passing through said output flow opening width flows above said output guide member bottom to said output opening through said grit removal chamber vertical wall output opening to said effluent channel;
wherein said unitary output guide member is adjustably mounted to said grit removal chamber and effluent channel for selective movement through a range of motion whereby the guide wall forward end is at a selected one of a range of spacings from said grit removal chamber vertical wall, and said output guide member bottom extends from said guide wall into said effluent channel to cover substantially the entirety of the horizontal space between the guide wall and the output opening through the grit removal chamber vertical wall through said range of motion.

2. The grit removal unit of claim 1, wherein adjustment of said first and second gates and said output guide member are coordinated based on anticipated flow through said grit removal unit.

3. The grit removal unit of claim 1, wherein said second gate is closed to block flow through said second influent channel portion when low flow of wastewater with grit is anticipated.

4. The grit removal unit of claim 1, wherein said output opening is positioned at about 270 degrees around the grit removal chamber from the input opening.

5. The grit removal unit of claim 4, wherein said influent channel and said effluent channel are substantially parallel with said wastewater flowing in opposite directions.

6. The grit removal unit of claim 1, wherein said divider wall is spaced a distance "a" from said one influent channel side wall and spaced a distance "b" from the other influent channel side wall, where "a" and "b" are not equal.

7. The grit removal unit of claim 6, wherein the distance "a" provides a flow velocity sufficiently high during anticipated low flow of said wastewater with grit to prevent significant settlement of grit from the wastewater in the influent channel.

8. The grit removal unit of claim 1, wherein the output guide member is pivotable about the guide wall rear end, said guide wall rear end being adjacent a side of said output opening through the grit removal chamber vertical wall.

9. The grit removal unit of claim 1, wherein said guide wall of said output guide member is selectively positioned relative to said grit removal chamber vertical wall to provide an effective effluent opening of substantially the same width as the width of the influent channel portions having open gates.

10. The grit removal unit of claim 1, wherein said divider wall is a baffle having an adjustable height.

11. A grit removal unit for a wastewater system, comprising:
  a round grit removal chamber defined by a grit removal chamber bottom surface and a substantially annular grit removal chamber vertical wall extending up from said bottom surface;
  an input opening through said grit removal chamber vertical wall, said input opening having a bottom surface above the bottom surface of the grit removal chamber, with a sloped bottom surface extending between said input opening bottom surface and said chamber bottom surface;
  an output opening through said grit removal chamber vertical wall, said output opening having an output opening bottom above the grit removal chamber bottom surface;
  an influent channel for directing wastewater with grit from an upstream end to a downstream end into said grit removal chamber through said grit removal chamber vertical wall input opening, said influent channel having two side walls;
  an effluent channel for wastewater output from said grit removal chamber through said output opening; and
  a unitary output guide member having a guide wall extending upwardly from a substantially horizontal output guide member bottom along an edge of said output guide member bottom, wherein
    said guide wall has
      a forward end spaced from said grit removal chamber vertical wall at said output opening to define an output flow opening width between said grit removal chamber vertical wall and said guide member guide wall forward end, and
      a rear end extending through said output opening and into said effluent channel, and
    said output guide member bottom extends from said guide wall within said grit removal chamber into said effluent channel across substantially the entire width of the output opening whereby effluent passing through said output flow opening width flows above said output guide member horizontal bottom to said output opening through said grit removal chamber vertical wall output opening to said effluent channel;
  wherein said unitary output guide member is adjustably mounted to said grit removal chamber and effluent channel for selective movement through a range of motion whereby
    the guide wall forward end is at a selected one of a range of spacings from said grit removal chamber vertical wall, and
    said output guide member horizontal bottom extends from said guide wall into said effluent channel to cover substantially the entirety of the horizontal space between the guide wall and the output opening through the grit removal chamber vertical wall through said range of motion.

12. The grit removal unit of claim 11, wherein the output guide member is pivotable about the guide wall rear end, said guide wall rear end being adjacent a side of said output opening through the grit removal chamber vertical wall.

13. The grit removal unit of claim 11, further comprising:
  a divider wall extending upwardly in said influent channel between said influent channel side walls and defining a first influent channel portion between said divider wall and one influent channel side wall and a second influent channel portion between said divider wall and the other influent channel side wall; and
  first and second gates at the upstream end of said first and second influent channel portions, respectively, said first gate being adjustable to selectively open flow of wastewater with grit to said first influent channel portion and said second gate being adjustable to selectively open flow of wastewater with grit to said second influent channel portion.

14. The grit removal unit of claim 13, wherein said divider wall is a baffle having an adjustable height.

* * * * *